(12) United States Patent
Kong et al.

(10) Patent No.: US 12,319,236 B2
(45) Date of Patent: Jun. 3, 2025

(54) STRUCTURE FOR FIXING MOVABLE DEVICE

(71) Applicants: Hyundai Motor Company, Seoul (KR); Kia Corporation, Seoul (KR); NIFCO KOREA Inc., Chungcheongnam-do (KR)

(72) Inventors: Byung Seok Kong, Gyeonggi-do (KR); Geun Heung Kim, Chungcheongnam-do (KR)

(73) Assignees: Hyundai Motor Company, Seoul (KR); Kia Corporation, Seoul (KR); NIFCO KOREA Inc., Chungcheongnam-do (KR)

( * ) Notice: Subject to any disclaimer, the term of this patent is extended or adjusted under 35 U.S.C. 154(b) by 430 days.

(21) Appl. No.: 18/079,232

(22) Filed: Dec. 12, 2022

(65) Prior Publication Data
US 2023/0398941 A1    Dec. 14, 2023

(30) Foreign Application Priority Data
Jun. 8, 2022    (KR) .......................... 10-2022-0069381

(51) Int. Cl.
*B60R 7/04*    (2006.01)
(52) U.S. Cl.
CPC ..................... *B60R 7/04* (2013.01)

(58) Field of Classification Search
CPC ...... B60R 7/04; B60N 2/0727; B60N 2/0825; B60N 2/0875
See application file for complete search history.

(56) References Cited

U.S. PATENT DOCUMENTS 11,827,181 B2 *  11/2023  An .............................. B60R 7/04
2022/0169182 A1 *  6/2022  An .............................. B60R 7/04

FOREIGN PATENT DOCUMENTS

KR      10-1125280 B1      3/2012
KR   10-2022-0075498 A     6/2022

* cited by examiner

*Primary Examiner* — Lori Lyjak
(74) *Attorney, Agent, or Firm* — Fox Rothschild LLP

(57) ABSTRACT

Disclosed is a structure for fixing a movable device. The structure for fixing a movable device includes a rail unit mounted inside the floor of a vehicle, a storage part configured to be movable along the rail unit, and a fixing unit provided on the storage part so as to be adjacent to the rail unit to limit movement of the storage part. The fixing unit includes a housing disposed in the storage part, a locking rod disposed in the housing and configured to be insertable into a fixing bracket disposed on the rail unit, a first limiting rod configured to limit movement of the locking rod in a vertical direction, and a second limiting rod configured to limit movement of the first limiting rod in the state of separation of the first limiting rod from the locking rod.

15 Claims, 7 Drawing Sheets

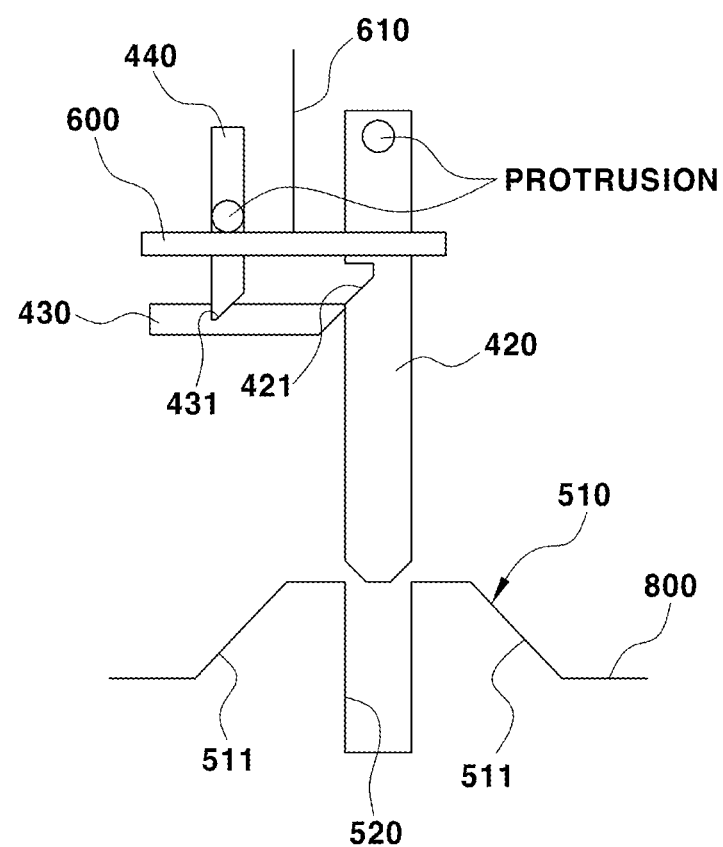

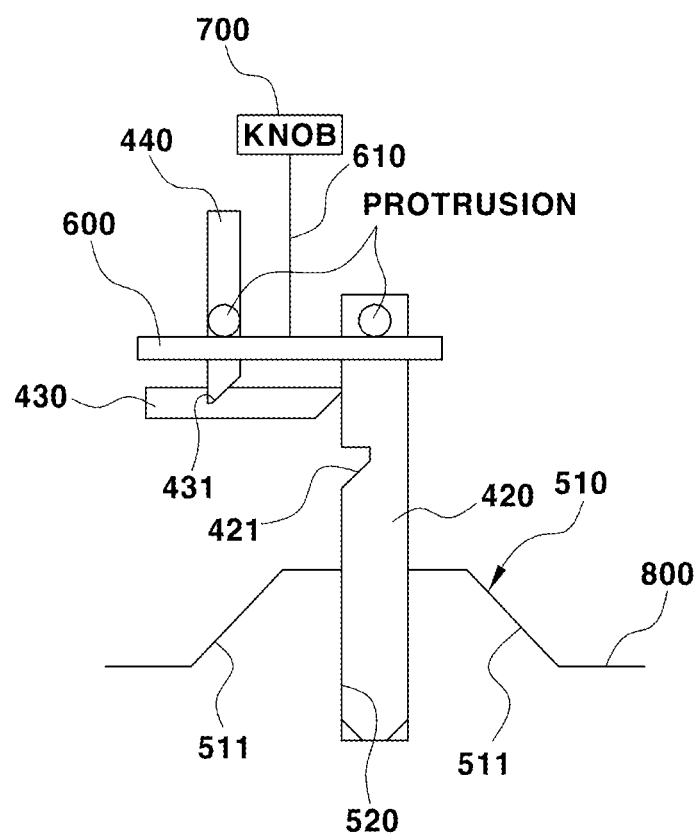

STRUCTURE FOR FIXING MOVABLE DEVICE

CROSS-REFERENCE TO RELATED APPLICATION

This application claims, under 35 U.S.C. § 119(a), the benefit of priority from Korean Patent Application No. 10-2022-0069381 filed on Jun. 8, 2022, the entire contents of which are incorporated herein by reference.

BACKGROUND

(a) Technical Field

The present disclosure relates to a structure for fixing a movable device. More particularly, it relates to a movable-device-fixing structure for a vehicle in which a rail unit is mounted inside a floor and a storage device is provided so as to be movable along the rail unit, the movable-device-fixing structure being configured to enable the storage device to be moved along the shape of the rail unit or to be fixed to the rail unit using a fixing unit provided on the storage device.

(b) Background Art

With the recent development of autonomous vehicles, a structure for freely rotating or moving a seat has come to be required in order to allow an occupant to efficiently use the space in the vehicle. In a conventional vehicle, however, it is difficult to form a structure for easily changing the direction of a seat or moving the same in a lateral direction.

In this case, it is important not only to enable a vehicle seat to be easily displaced, for example, rotated or moved linearly, but also to ensure reliable mounting of the vehicle seat to the vehicle body while allowing mobility of the vehicle seat in this manner. To this end, a method or device for allowing or blocking displacement of the vehicle seat is required for the vehicle.

Moreover, in addition to a device for displacing the vehicle seat, a device for moving a storage device, which is located in the interior of the vehicle, in at least one direction depending on a change in the arrangement of the vehicle seats or a user's request is necessarily required.

That is, similar to a displaceable vehicle seat, there is demand for a storage device that is movable to any of various positions on the upper surface of a floor in response to changes in the indoor environment of the vehicle.

Furthermore, there is a need for a robust locking structure for preventing the storage device, once moved to a certain position, from escaping from the position while the vehicle is traveling.

The above information disclosed in this Background section is only for enhancement of understanding of the background of the disclosure, and therefore it may contain information that does not form the related art that is already known in this country to a person of ordinary skill in the art.

RELATED ART DOCUMENT

Patent Document

Patent Document 1: Korean Patent Registration No. 10-1125280

SUMMARY OF THE DISCLOSURE

The present disclosure has been made in an effort to solve the above-described problems associated with the related art, and it is an object of the present disclosure to provide a movable-device-fixing structure capable of moving a storage device to any of various positions or fixing the position of the storage device in the interior of a vehicle.

Specifically, the present disclosure provides a movable-device-fixing structure capable of enabling the movable storage device to be moved along a rail unit mounted inside a floor of the vehicle or to be engaged with the rail unit at a predetermined fixing position using a fixing unit provided on the storage device and thus to be fixed at the predetermined fixing position.

The objects of the present disclosure are not limited to the above-mentioned objects, and other objects not mentioned herein will be clearly understood by those skilled in the art from the following description, and will become apparent with reference to the embodiments of the present disclosure. In addition, the objects of the present disclosure can be accomplished by the components described in the appended claims and combinations thereof.

In one aspect, the present disclosure provides a structure for fixing a movable device, including a rail unit configured to be mounted inside the floor of a vehicle, a storage part configured to be movable along the rail unit, and a fixing unit disposed on the storage part adjacent to the rail unit, the fixing unit being configured to limit movement of the storage part. The fixing unit includes a housing disposed in the storage part, a locking rod disposed in the housing and configured to be selectively insertable into a first fixing bracket disposed on the rail unit, a first limiting rod configured to selectively limit movement of the locking rod in a vertical direction, and a second limiting rod configured to selectively limit movement of the first limiting rod in the state of separation condition in which the first limiting rod is separated from the locking rod.

In a preferred embodiment, a plurality of fixing brackets may be provided, including the first fixing bracket. In various embodiments, each fixing bracket may be located at at least one position along the moving path of the locking rod, and each fixing bracket may project in the vertical direction over the rail unit.

In another preferred embodiment, the first fixing bracket may include a locking hole formed therein and configured to allow the locking rod to be inserted thereinto and a tapered portion extending from the locking hole in the moving direction of the locking rod.

In still another preferred embodiment, the tapered portion may project upwards over the rail unit, and may gradually decrease in height in a direction away from the locking hole.

In yet another preferred embodiment, the locking rod may be configured to enter the housing as the locking rod is moved along the tapered portion, and may be inserted into the locking hole as the locking rod is aligned with the locking hole.

In still yet another preferred embodiment, the locking rod may have a fixing hole formed therein, and as the storage part moves, the first limiting rod may be configured to be inserted into the fixing hole to limit movement of the locking rod in the vertical direction as the storage part moves.

In a further preferred embodiment, as the locking rod moves along the fixing bracket, the locking rod may be moved upwards in the vertical direction of the storage part, and the first limiting rod may be moved horizontally out of the fixing hole in response to the movement of the locking rod.

In another further preferred embodiment, the first limiting rod may have a limiting hole formed therein, and as the storage part moves, the second limiting rod may be configured to be inserted into the limiting hole to limit horizontal movement of the first limiting rod.

In still another further preferred embodiment, as the first limiting rod moves horizontally in response to movement of the locking rod, the second limiting rod may be configured to be moved out of the limiting hole in the vertical direction in response to movement of the first limiting rod.

In yet another further preferred embodiment, the fixing unit may further include an elastic member disposed in the housing and configured to elastically support one end of the locking rod, and the elastic member may be configured to apply elastic force to the locking rod so that the locking rod is moved downwards in the vertical direction.

In still yet another further preferred embodiment, the fixing unit may further include a moving rod configured to integrally move the second limiting rod and the locking rod and a cable connected to the moving rod. In various embodiments, the cable may be configured to transfer tensile force applied thereto to the moving rod in response to a user's request. As tensile force is applied to the cable, the second limiting rod may be configured to be released from the first limiting rod, and the locking rod may be configured to be moved upwards.

In a still further preferred embodiment, the fixing unit may further include a knob disposed at the storage part, the knob being configured to be connected to the cable to apply tensile force to the cable when user input is transmitted to the knob.

In a yet still further preferred embodiment, as tensile force is applied to the cable the tensile force is transferred to the moving rod, the moving rod may be configured to couple to a protrusion formed at the locking rod and to a protrusion formed at the second limiting rod, and may be configured to integrally move the locking rod and the second limiting rod.

In a yet still further preferred embodiment, the fixing unit may further include a first spring configured to apply an elastic force to the first limiting rod so that the first limiting rod is engaged with the locking rod and a second spring configured to apply an elastic force to the second limiting rod so that the second limiting rod is engaged with the first limiting rod.

Other aspects and preferred embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary embodiments thereof, illustrated in the accompanying drawings, which are given hereinbelow by way of illustration only, and thus are not limitative of the present disclosure, and wherein:

FIG. 6B shows the coupling relationships between the components of the fixing unit when the storage part reaches a fixing bracket according to the embodiment of the present disclosure;

FIG. 6D shows the coupling relationships between the components of the fixing unit when the locking rod is moved out of the locking hole according to the embodiment of the present disclosure.

Figure 1:
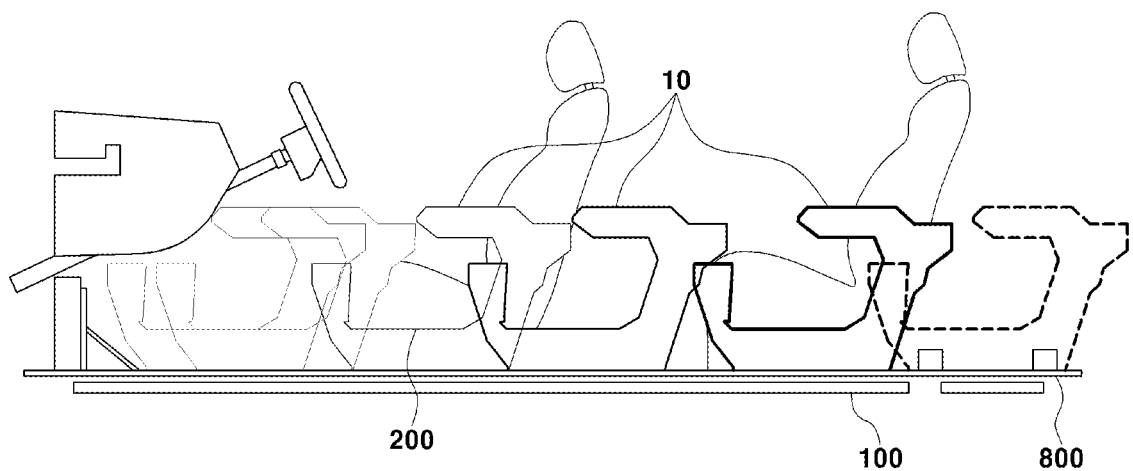
FIG. 1 shows the operation of a storage device according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings. The present disclosure may, however, be embodied in many different forms, and should not be construed as being limited to the embodiments set forth herein. Rather, these embodiments are provided so that the disclosure will be thorough and complete, and will fully convey the scope of the disclosure to those skilled in the art.

The terms "- part" and "- unit" used in the specification mean units for processing at least one function or operation, and can be implemented as hardware components, software components, or combinations of hardware components and software components.

Further, in the following description, the terms "first" and "second" are used only to avoid confusing designated components, and do not indicate the sequence or importance of the components or the relationships between the components.

Further, in the following description, the term "storage part" may have the same meaning as "storage device", and may encompass all structures that are moved along a rail unit.

Further, in the following description, the term "vertical direction" refers to the direction along the height direction of the storage part, and the term "horizontal direction" refers to a direction perpendicular to the vertical direction, for example, the longitudinal direction and/or the widthwise direction of the storage part. It shall be understood that although the terms "vertical direction" and "horizontal direction" are relative terms that the orientation used herein is made with reference to the orientation of various parts, components, and systems shown in the FIGS.

Hereinafter, an embodiment will be described in detail with reference to the accompanying drawings. The same or extremely similar components are denoted by the same reference numerals throughout the specification, and duplicate descriptions thereof will be omitted.

Figure 2:
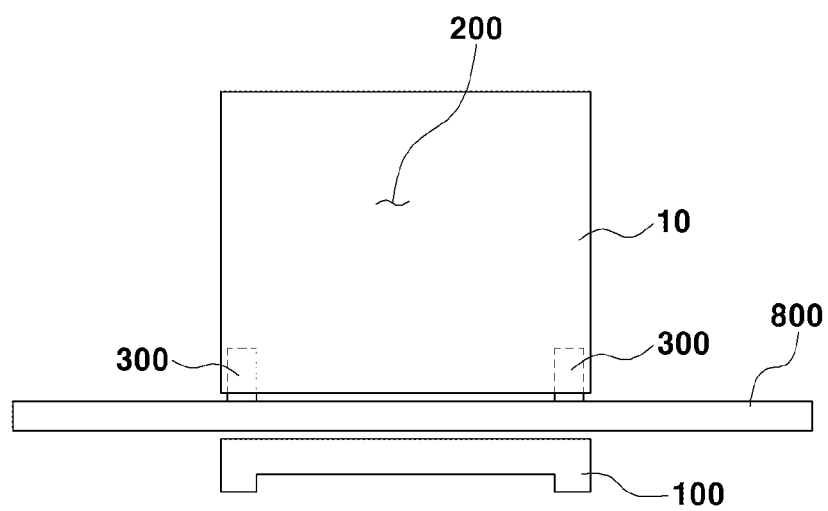
FIG. 2 is a cross-sectional side view of the storage device and a rail unit according to an embodiment of the present disclosure.

FIG. 1 is a side view of a vehicle including a storage device 10 according to an embodiment of the present disclosure, and FIG. 2 is a side view of the storage device 10 and a rail unit 100.

As illustrated, the storage device 10 is configured to be slidable on the upper surface of a floor 800 of the vehicle. The rail unit 100 is mounted inside the floor 800, and the storage device 10 is moved along the rail unit 100.

The storage device 10 includes a storage part 200 configured to store a user's luggage or portable item, a driving part 300 located on the lower end of the storage part 200 and configured to move along the rail unit 100, and a fixing unit 400 formed on the lower end of the storage part 200 so as to face the floor 800 and configured to move in the vertical direction so as to be fastened to the rail unit 100.

A controller configured to control the movement of the storage device 10 in response to user input is further included. In addition, the controller may measure the position of the storage device 10, and may control the intensity of the magnetic force of the driving unit 300, which is made of a magnetic substance.

The rail unit 100 is fixedly mounted inside the floor 800, and the driving unit 300 is disposed at a position corresponding to the rail unit 100 and moves along the rail unit 100 in the state of being in contact with the upper surface of the floor 800.

The floor 800 may be made of a non-magnetic material, and may be formed to be thin. The reason for this is to prevent a change in the magnetic force of the driving unit 300, which is made of a magnetic substance, and to prevent loss of the magnetic force thereof.

In another embodiment of the present disclosure, the storage device 10 may not include a separate storage part 200, and may include a storage space or an electronic component, which is located inside the driving unit 300.

Further, in the same embodiment, the driving unit 300 may freely move along the upper surface of the floor 800, and the floor 800 may be formed to have the same physical properties as the rail unit 100. In addition, a locking rod 420 is formed on the side surface of the storage part 200, and a fixing bracket 500 is disposed on the rail unit 100. When the locking rod 420 is moved to a position corresponding to the fixing bracket 500, the locking rod 420 is fastened to the fixing bracket 500.

The fixing bracket 500 is formed such that at least a portion thereof projects over the upper surface of the rail unit 100. When the locking rod 420 is moved in the state of being in contact with the fixing bracket 500, the locking rod 420 is inserted into a housing 410. Further, the locking rod 420 is inserted into a locking hole 520 in the fixing bracket 500 thereby restricting the movement of the storage device 10.

The driving unit 300 is configured to generate operating force in the longitudinal direction of the rail unit 100 so that the same can move along the rail unit 100, release force in the lateral direction of the rail unit 100, and removal force in the vertical direction based on the plane on which the rail unit 100 is located. The driving unit 300 may be made of a magnetic substance that generates a magnetic field, and the controller may control the magnetic force of the driving unit 300 in order to generate a repulsive force so that the driving unit 300 can be removed from the rail unit 100 or an attractive force so that the driving unit 300 can move in the state of being adjacent to the rail unit 100.

In an embodiment of the present disclosure, the removal force needs magnetic force greater than the release force and the operating force, and the release force needs magnetic force greater than the operating force.

When the thickness of the floor 800 decreases, the magnetic force required for the operating force, the release force, and the removal force becomes greater, and when the thickness of a magnet increases and/or the thickness of the rail unit increases, the magnetic force required for the operating force, the release force, and the removal force becomes greater.

In an embodiment of the present disclosure, the driving unit 300 may take the form of a cylindrical roller in which N poles and S poles are alternately arranged, and may be fastened to the storage part 200. Further, the driving unit 300 may be formed such that the magnetic force of the region thereof that is close to both edges of the rail unit 100 is greater than the magnetic force of the center region thereof. Accordingly, it is possible to prevent the driving unit 300 from being separated from the rail unit 100.

In addition, as shown in FIG. 2, the rail unit 100 is formed to increase in thickness from the center portion thereof toward both lateral ends thereof so that the magnetic force required for the release force of the driving unit 300, which is made of a magnetic substance, is increased. Preferably, the rail unit 100 may be formed such that both lateral surfaces thereof are bent downwards in a direction perpendicular to the plane of the rail unit 100.

As described above, in the embodiment of the present disclosure, the thickness of each of both lateral surfaces of the rail unit 100 may be set to be greater than the thickness of the center portion thereof in order to prevent the driving unit 300 from being deflected in both lateral directions of the rail unit 100.

Figure 3:
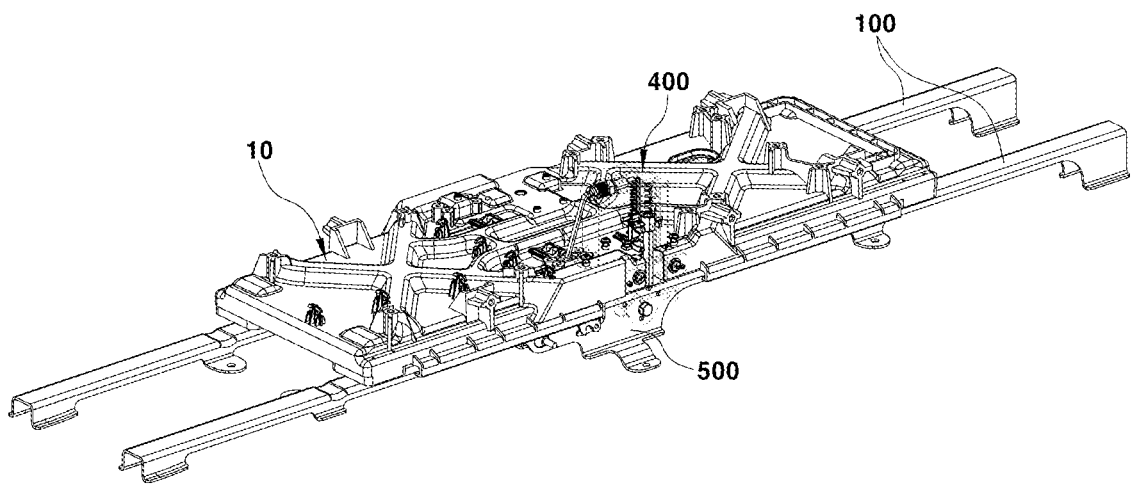
FIG. 3 is a perspective view of a structure for fixing the storage device according to an embodiment of the present disclosure.
Figure 4:
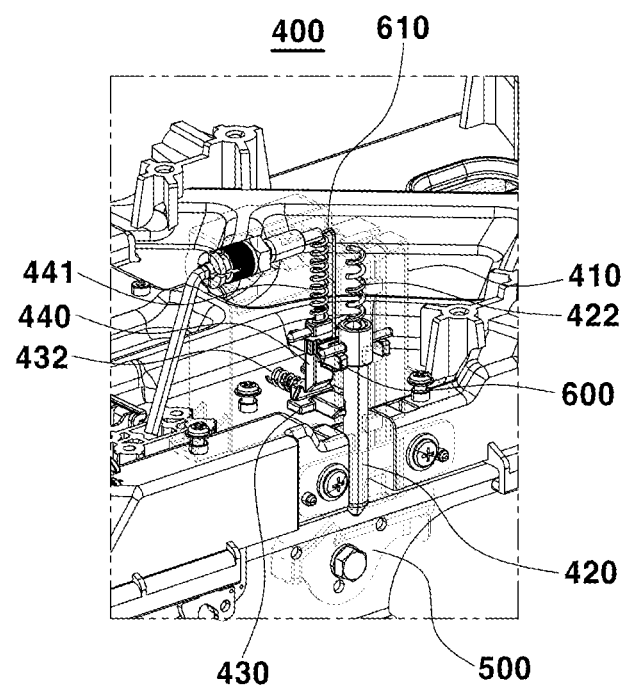
FIG. 4 is an enlarged view of the structure for fixing the storage device according to the embodiment of the present disclosure.
Figure 5:
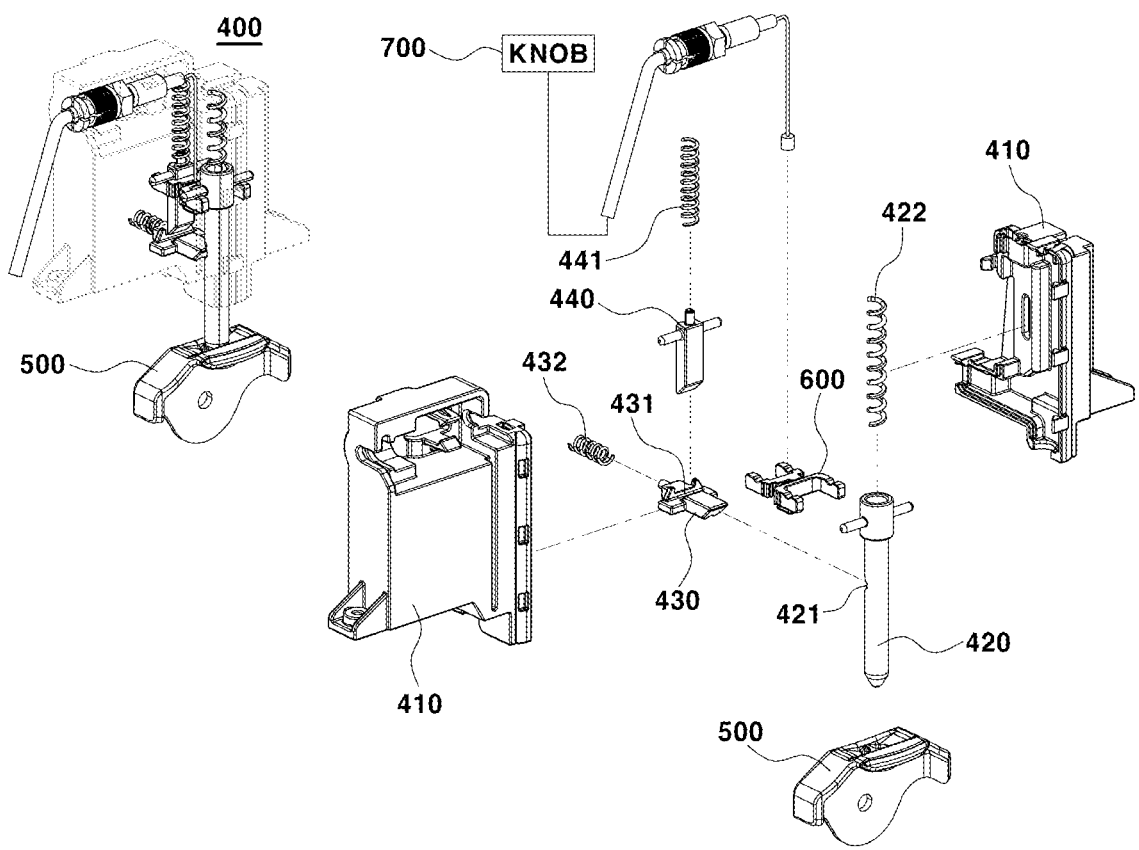
FIG. 5 is a view showing the configuration of a fixing unit of the structure for fixing the storage device according to an embodiment of the present disclosure.

FIG. 3 is a view showing the configuration of the storage device 10 including a fixing structure according to an embodiment of the present disclosure, and FIG. 4 is an enlarged view of the fixing structure. FIG. 5 is a view showing the configuration of the fixing unit 400.

As illustrated, the rail unit 100, which includes a pair of rails, is mounted inside the floor 800. The storage part 200, which includes the driving unit 300, is disposed on the upper surface of the rail unit 100 so as to move in the longitudinal direction of the rail unit 100. The fixing unit 400 is disposed on the side surface of the lower end portion of the storage part 200. When the fixing unit 400 is located at a position corresponding to the fixing bracket 500, which is disposed on the rail unit 100, the fixing unit 400 is fastened to the fixing bracket 500.

The driving unit 300 may be made of a magnetic substance, and may be controlled by the controller such that the magnetic force thereof is reduced when the storage device 10 moves and such that the magnetic force thereof is increased when the storage device 10 is located at a fixing position.

In addition, at least one fixing bracket 500 is disposed on the rail unit 100 so as to be located at a position corresponding to the fixing position. The fixing bracket 500 projects over the upper end of the rail unit 100 so that the locking rod 420 contacts the upper end of the fixing bracket 500.

The fixing unit 400 includes a housing 410, which is disposed on the side surface of the lower end portion of the storage part 200 so as to be adjacent to the rail unit 100, and a locking rod 420, which is disposed in the housing 410 so as to face the floor 800 or the fixing bracket 500 and is configured to be movable in the vertical direction of the storage part 200. The fixing unit 400 further includes a first limiting rod 430, which is located in the housing 410 and is configured to be selectively inserted into a fixing hole 421 formed in the side surface of the locking rod 420, and a second limiting rod 440, which is inserted into a limiting hole 431 formed in the first limiting rod 430 to limit the horizontal movement of the first limiting rod 430.

When the storage device 10 is moved along the rail unit 100, the locking rod 420 is maintained in the projecting state, and the first limiting rod 430 is maintained in the state of being inserted into the fixing hole 421. In addition, the locking rod 420 is maintained in the state of being spaced a predetermined gap apart from the floor 800, so the storage device 10 is capable of being moved freely. When the storage part 200 approaches the fixing bracket 500, the lower end of the locking rod 420 comes into contact with the fixing bracket 500, and thus the locking rod 420 moves upwards in the vertical direction. Subsequently, the first limiting rod 430 is pushed out of the fixing hole 421 in response to the upward movement of the locking rod 420.

When the first limiting rod 430 moves a predetermined distance in the horizontal direction away from the fixing hole 421, the second limiting rod 440 is inserted into the limiting hole 431, thereby limiting the horizontal movement of the first limiting rod 430. Accordingly, the movement of the first limiting rod 430 is limited by engagement with the second limiting rod 440, and the locking rod 420 is capable of moving freely in the vertical direction.

In addition, the fixing unit 400 further includes an elastic member 422, which is disposed in the housing 410 so as to elastically support the upper end of the locking rod 420. The elastic member 422 applies elastic force to the locking rod 420 so that the locking rod 420 is maintained in the state of projecting toward the rail unit 100. Accordingly, in the state in which the first limiting rod 430 is fixed by the second limiting rod 440, the locking rod 420 is moved along a tapered portion 510 of the fixing bracket 500 and is then inserted into the locking hole 520 in the fixing bracket 500 by the elastic member 422.

At least one fixing bracket 500 may be mounted on the side surface of the rail unit 100 in the path along which the fixing unit 400 moves. Preferably, the fixing bracket 500 may be located on the outer side surface of each of the pair of rails of the rail unit 100, and the fixing unit 400 may be located on each of both side surfaces of the storage part 200 so as to be aligned with the fixing bracket 500.

The locking hole 520 may be formed in the center region of the fixing bracket 500. When the locking rod 420 is inserted into the locking hole 520, the storage device 10 may be fixed by the fixing bracket 500. The fixing bracket 500 includes a tapered portion 510, which gradually decreases in height from the locking hole 520 toward each of both ends thereof in the direction in which the storage device 10 moves. When the storage device 10 moves in the longitudinal direction of the rail unit 100, the locking rod 420 comes into initial contact with one of both ends of the tapered portion 510. The tapered portion 510 includes a slanted surface 511, which is slanted in the vertical direction so that the locking rod 420 enters the housing 410 when the storage device 10 moves in the longitudinal direction of the rail unit 100. Preferably, the portion of the fixing bracket 500 that projects over the upper surface of the rail unit 100 may be formed as the tapered portion 510.

When the storage device 10 moves in the longitudinal direction of the rail unit 100, the locking rod 420 is moved along the fixing bracket 500. That is, the locking rod 420 is moved toward the upper end of the tapered portion 510 in the vertical direction, and the first limiting rod 430 is moved in the horizontal direction so as to be separated from the fixing hole 421 in response to the upward movement of the locking rod 420. Further, when the first limiting rod 430 is moved in the horizontal direction and thus the limiting hole 431 in the first limiting rod 430 is aligned with the lower end of the second limiting rod 440, the second limiting rod 440 is moved downwards in the vertical direction such that at least a portion thereof is inserted into the limiting hole 431 in the first limiting rod 430.

Thereafter, the first limiting rod 430 is maintained in the state of being engaged with the second limiting rod 440, and the locking rod 420 is maintained in the state of being freely movable in the vertical direction. When the locking rod 420 reaches a position corresponding to the locking hole 520, the locking rod 420 is moved downwards into the locking hole 520, whereby the storage device is fixed by the fixing bracket 500.

In addition, the present disclosure further includes a moving rod 600, which causes the locking rod 420 and the second limiting rod 440 to integrally move in the vertical direction, and a cable 610, which is located between the moving rod 600 and a knob 700. When tensile force is applied to the cable 610, the moving rod 600 connected to the cable 610 is coupled to a protrusion formed at the locking rod 420 and to a protrusion formed at the second limiting rod 440, and moves the locking rod 420 and the second limiting rod 440 upwards in the vertical direction. In detail, when a user's request for release is transmitted to the knob 700, which is located at the storage device 10, the knob 700 applies tensile force to the cable 610, and thus the cable 610 pulls up the moving rod 600 in the vertical direction. Consequently, the locking rod 420 and the second limiting rod 440 are integrally moved upwards in the vertical direction by the upward movement of the moving rod 600 in the vertical direction. Accordingly, the locking rod 420 is separated from the locking hole 520, and the second limiting rod 440 is separated from the limiting hole 431 in the first limiting rod 430. Subsequently, the first limiting rod 430 is re-inserted into the fixing hole 421 in the locking rod 420. Preferably, the knob 700 of the present disclosure may encompass a mechanical knob, which is located at the storage device 10, and an electronic knob, which includes an electronic device located in the vehicle and configured to apply tensile force to the cable 610.

In addition, the present disclosure further includes a first spring 432, which is located in the housing 410 and elastically supports one end of the first limiting rod 430 in order to apply elastic force to the first limiting rod 430 in the direction of the locking rod 420 so that the first limiting rod 430 is re-inserted into the fixing hole 421 in the locking rod 420, and a second spring 441, which is located in the housing 410 and elastically supports one end of the second limiting rod 440 in order to apply elastic force to the second limiting rod 440 in the direction of the first limiting rod 430 so that the second limiting rod 440 is inserted into the limiting hole 431 in the first limiting rod 430.

In summary, in the initial state of the fixing unit 400, the locking rod 420 projects outwards beyond the lower end of the housing 410, and the first limiting rod 430 is inserted into the fixing hole 421 in the locking rod 420. When the storage device 10 moves along the rail unit 100, the locking rod 420 approaches the fixing bracket 500. Subsequently, the locking rod 420 moves upwards in the vertical direction along the slanted surface 511 of the tapered portion 510 of the fixing bracket 500 while entering the housing 410.

Simultaneously therewith, the first limiting rod 430 inserted into the fixing hole 421 in the locking rod 420 is moved out of the fixing hole 421 in the horizontal direction along a slanted portion formed in the fixing hole 421 in response to the upward movement of the locking rod 420. In addition, the second limiting rod 440, which is located adjacent to the first limiting rod 430, is inserted into the limiting hole 431 in the first limiting rod 430, which is moving in the horizontal direction, thereby limiting the movement of the first limiting rod 430. Accordingly, the locking rod 420 becomes capable of moving freely in the vertical direction, and thus is inserted into the locking hole 520 formed in the fixing bracket 500.

FIGS. 6A to 6D show the operation of the fixing unit 400 depending on a change in the position of the storage part 200 according to an embodiment of the present disclosure.

Figure 6A:
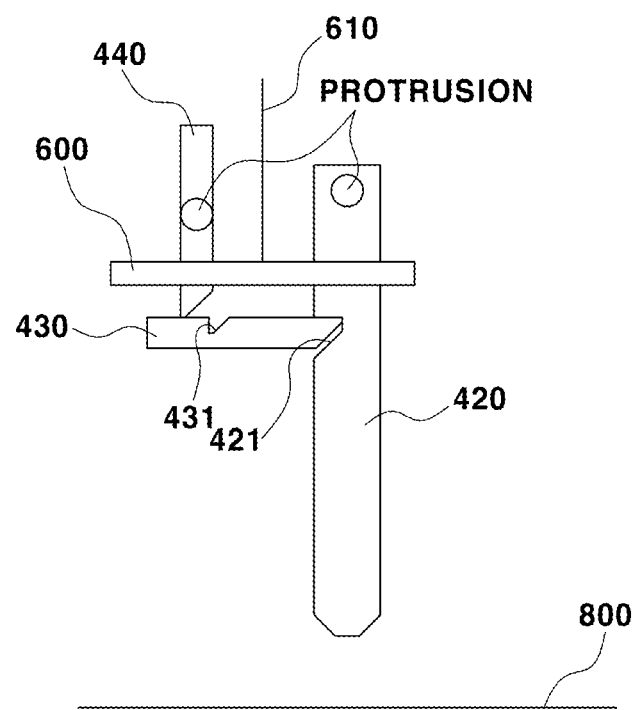
FIG. 6A shows the coupling relationships between the components of the fixing unit when a storage part moves along the rail unit according to the embodiment of the present disclosure.

FIG. 6A shows the coupling relationships between the components of the fixing unit 400 when the storage part 200 moves along the portion of the rail unit 100 in which the fixing bracket 500 is not present.

The locking rod 420 of the fixing unit 400 is located in the housing 410 such that at least a portion thereof projects over the lower end of the housing 410. The projecting end of the locking rod 420, i.e. the lower end thereof, is spaced a predetermined gap apart from the rail unit 100 or the floor 800 in order to avoid interference therewith. Preferably, in an embodiment of the present disclosure, the predetermined gap between the lower end of the locking rod 420 and the floor 800 may be set to 3 mm.

The elastic member 422 elastically supports the end of the locking rod 420 that is received in the housing 410, thereby applying elastic force to the locking rod 420 in the downward direction. When the projecting end of the locking rod 420, i.e. the lower end thereof, is inserted into the housing 410, the elastic member 422 applies elastic force to the locking rod 420 so that the locking rod 420 is moved downwards.

The fixing hole 421 is formed in the portion of the locking rod 420 that is received in the housing 410, and the first limiting rod 430 is disposed perpendicular to the locking rod 420 such that one end thereof is inserted into the fixing hole 421. The first spring 432 is disposed to elastically support the other end of the first limiting rod 430 in order to apply elastic force to the first limiting rod 430 in the direction of the fixing hole 421. In addition, the fixing hole 421 is formed in the locking rod 420 so as to be slanted inwards from the outer side surface of the locking rod 420 so that the first limiting rod 430 inserted into the fixing hole 421 can be moved out of the fixing hole 421 in the horizontal direction in response to the upward movement of the locking rod 420 in the vertical direction.

The second limiting rod 440 is disposed such that one end thereof is in contact with or adjacent to the outer side surface of the first limiting rod 430 in the state in which the first limiting rod 430 is engaged with the locking rod 420. The second spring 441 is disposed to elastically support the other end of the second limiting rod 440 in order to apply elastic force to the second limiting rod 440 in the direction of the first limiting rod 430.

In this state, when the storage device 10 moves in the longitudinal direction of the rail unit 100, movement of the locking rod 420 in the vertical direction is limited by the first limiting rod 430 inserted into the fixing hole 421. Further, since the fixing unit 400 is located so as to avoid interference with the rail unit 100 or the floor 800, the storage device 10 is capable of moving freely along the rail unit 100.

FIG. 6B shows the coupling relationships between the components of the fixing unit 400 when the storage device 10 passes through the fixing bracket 500 located on the rail unit 100.

At least one fixing bracket 500 is mounted on the rail unit 100 in the path along which the fixing unit 400 moves. Preferably, the position of the fixing bracket 500 may be determined so as to correspond to the fixing position of the storage device 10.

The fixing bracket 500 includes a tapered portion 510, which extends from the locking hole 520, into which the locking rod 420 of the fixing unit 400 is inserted, toward each of both ends thereof in the longitudinal direction in which the storage device 10 moves. The tapered portion 510 is formed to be slanted such that the height thereof gradually decreases in a direction away from the locking hole 520. Preferably, the upper end of the tapered portion 510 may be spaced apart from the floor 800 by 8 mm.

When the fixing unit 400 approaches the tapered portion 510, the lower end of the locking rod 420 comes into contact with the upper surface of the tapered portion 510. As the storage part 200 moves further, the locking rod 420 moves upwards in the vertical direction along the slanted surface 511 of the tapered portion 510.

As the locking rod 420 moves upwards in the vertical direction, the first limiting rod 430 inserted into the fixing hole 421 moves in the horizontal direction along the slanted portion formed in the fixing hole 421 in the locking rod 420, and the end of the first limiting rod 430 that is received in the fixing hole 421 is moved out of the fixing hole 421.

The end of the first limiting rod 430 that is moved out of the fixing hole 421 comes into contact with the outer side surface of the locking rod 420 that is adjacent to the fixing hole 421, and the limiting hole 431 in the first limiting rod 430 that is moved in the horizontal direction comes into alignment with the lower end of the second limiting rod 440. Because the second spring 441 applies elastic force to the second limiting rod 440 in the downward direction, when the limiting hole 431 in the first limiting rod 430 is aligned with the lower end of the second limiting rod 440, the lower end of the second limiting rod 440 is inserted into the limiting hole 431.

Accordingly, horizontal movement of the first limiting rod 430 is limited by the second limiting rod 440, and the locking rod 420 is released from the first limiting rod 430, and thus becomes capable of moving freely in the vertical direction. Accordingly, the locking rod 420 is moved upwards along the slanted surface 511 of the tapered portion 510, and is then inserted into the locking hole 520.

Figure 6C:
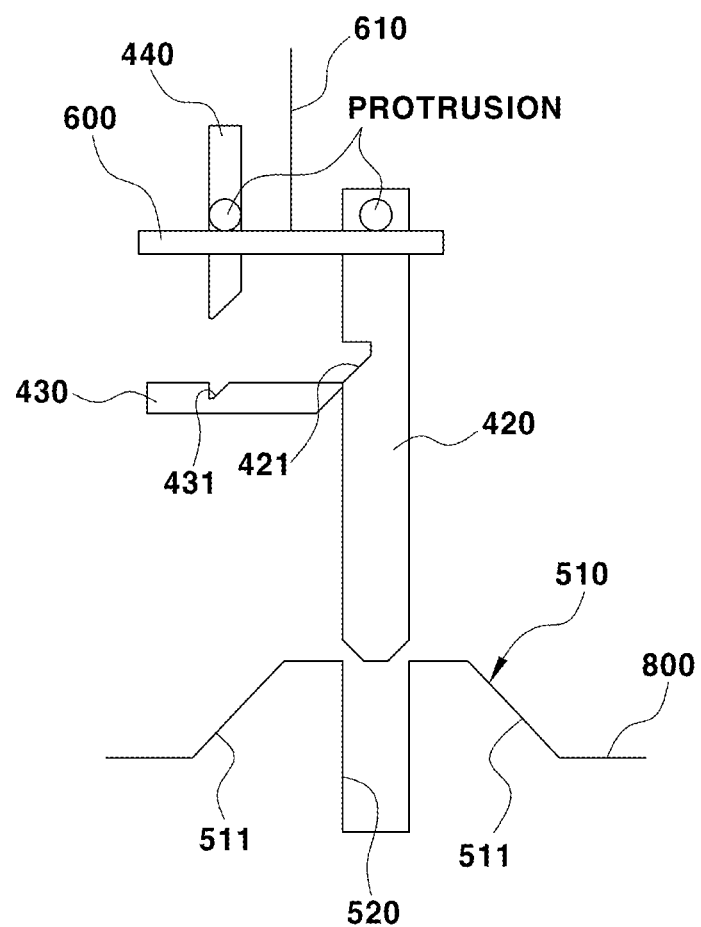
FIG. 6C shows the coupling relationships between the components of the fixing unit when a locking rod of the storage part is inserted into a locking hole according to the embodiment of the present disclosure.

FIG. 6C shows the state in which the movement of the storage device 10 along the rail unit 100 is limited by insertion of the locking rod 420, which is freely movable in the vertical direction, into the locking hole 520.

In an embodiment of the present disclosure, the locking hole 520 may be formed to have a depth of 13 mm based on the uppermost point of the tapered portion 510. Preferably, the locking hole 520 may be formed such that at least a portion thereof is located further downwards than the lower surface of the floor 800.

FIG. 6D shows the coupling relationships between the components of the fixing unit 400 when the knob 700 applies tensile force to the cable 610 in response to a user's request.

As illustrated, when a user's request for release of the fixing unit 400 from the rail unit 100 is transmitted to the knob 700, the knob 700 applies tensile force to the cable 610, which is physically or electrically connected thereto, and the moving rod 600 connected to the cable 610 integrally moves the second limiting rod 440 and the locking rod 420 upwards in the vertical direction.

Preferably, when tensile force is applied to the cable 610, the moving rod 600 connected to the cable 610 is moved upwards and is coupled to the protrusion protruding from the locking rod 420 and to the protrusion protruding from the second limiting rod 440, whereby the second limiting rod 440 and the locking rod 420 are integrally moved upwards in the vertical direction. More preferably, in an embodiment of the present disclosure, the locking rod 420, which is moved upwards in the vertical direction by the moving rod 600, may be spaced apart from the lowermost point of the locking hole 520 by 16 mm. Accordingly, when a user's request for release of the fixing unit 400 is transmitted to the knob 700, the locking rod 420 may be maintained in the state of being spaced apart from the tapered portion 510.

The lower end of the second limiting rod 440, which is moved upwards together with the moving rod 600 by the tensile force applied to the cable 610 by the operation of the knob 700, is separated from the limiting hole 431 in the first limiting rod 430, and the first spring 432 continuously applies elastic force to the first limiting rod 430 in the direction of the locking rod 420. At the same time, the lower end of the locking rod 420, which is moved upwards together with the moving rod 600, is separated from the locking hole 520. Accordingly, the storage device 10 is separated from the fixing bracket 500, and thus becomes movable along the rail unit 100.

When the operation of the knob 700 is stopped and thus the tensile force applied to the cable 610 is removed, the moving rod 600, the locking rod 420, and the second limiting rod 440 are restored to the original states thereof. Further, the first limiting rod 430 is inserted into the fixing hole 421 in the locking rod 420, and the lower end of the second limiting rod 440 is maintained in the state of being separated from the limiting hole 431 in the first limiting rod 430. Accordingly, the locking rod 420 is spaced apart from the floor 800 by a predetermined gap, and thus the storage device 10 becomes movable.

As is apparent from the above description, the present disclosure provides the following effects through the above embodiments and through the configurations and combination and use relationships described above.

The movable-device-fixing structure of the present disclosure enables the storage device to be freely moved in the interior of the vehicle, thereby improving the convenience of the user of the vehicle.

In addition, since the rail unit, along which the storage device is moved, is mounted inside the floor of the vehicle, the aesthetics of the interior of the vehicle may be improved.

In addition, since the storage device can be easily fixed to and released from the rail unit at any of various fixing positions, the convenience of the occupant of the vehicle may be improved.

The above description is illustrative of the present disclosure. Also, the above disclosure is intended to illustrate and explain preferred embodiments of the present disclosure, and the present disclosure may be used in various other combinations, modifications, and environments. In other words, the present disclosure may be changed or modified within the scope of the concept of the disclosure disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the above description is not intended to limit the present disclosure to the embodiments. Also, the appended claims should be construed as encompassing such other embodiments.

What is claimed is:

1. A structure for fixing a movable device, the structure comprising:
   a rail unit configured to be mounted inside a floor of a vehicle;
   a storage part configured to be movable along the rail unit; and
   a fixing unit disposed on the storage part adjacent to the rail unit, the fixing unit being configured to limit movement of the storage part,
   wherein the fixing unit comprises:
   a housing disposed in the storage part;
   a locking rod disposed in the housing and configured to be selectively insertable into a first fixing bracket disposed on the rail unit;
   a first limiting rod configured to selectively limit movement of the locking rod in a vertical direction; and
   a second limiting rod configured to selectively limit movement of the first limiting rod in a state of separation condition in which the first limiting rod is separated from the locking rod.

2. The structure of claim 1, further comprising:
   a plurality of fixing brackets, including the first fixing bracket,
   wherein each fixing bracket is provided at at least one position on a moving path of the locking rod, and
   wherein each fixing bracket projects upwards over the rail unit.

3. The structure of claim 1, wherein the first fixing bracket comprises:
   a locking hole formed therein and being configured to allow the locking rod to be inserted therein; and
   a tapered portion extending from the locking hole in a moving direction of the locking rod.

4. The structure of claim 3, wherein the tapered portion projects upwards over the rail unit, and gradually decreases in height in a direction away from the locking hole.

5. The structure of claim 3, wherein:
   the locking rod is configured to enter the housing as the locking rod is moved along the tapered portion, and
   the locking rod is configured to be inserted into the locking hole as the locking rod is aligned with the locking hole.

6. The structure of claim 1, wherein the locking rod has a fixing hole formed therein,
   wherein, the first limiting rod is configured to be inserted into the fixing hole to limit movement of the locking rod in the vertical direction as the storage part moves.

7. The structure of claim 6, wherein:
   the locking rod is configured to move upwards in the vertical direction of the storage part as the locking rod moves along the first fixing bracket, and the first limiting rod is configured to move horizontally out of the fixing hole in response to movement of the locking rod.

8. The structure of claim 1, wherein:
the first limiting rod has a limiting hole formed therein, and
the second limiting rod is configured to be inserted into the limiting hole to limit horizontal movement of the first limiting rod as the storage part moves.

9. The structure of claim 8, wherein, as the first limiting rod moves horizontally in response to movement of the locking rod, the second limiting rod is configured to be moved out of the limiting hole in the vertical direction in response to movement of the first limiting rod.

10. The structure of claim 1, wherein the fixing unit further comprises:
an elastic member disposed in the housing and configured to elastically support one end of the locking rod, and
wherein the elastic member is configured to apply an elastic force to the locking rod so that the locking rod is moved downwards in the vertical direction.

11. The structure of claim 1, wherein the fixing unit further comprises:
a moving rod configured to integrally move the second limiting rod and the locking rod; and
a cable connected to the moving rod and being configured to transfer tensile force applied thereto to the moving rod in response to a user's request,
wherein the second limiting rod is configured to be released from the first limiting rod as tensile force is applied to the cable, and
wherein the locking rod is configured to move upwards as tensile force is applied to the cable.

12. The structure of claim 11, wherein the fixing unit further comprises a knob disposed at the storage part, the knob being configured to be connected to the cable to apply tensile force to the cable when user input is transmitted to the knob.

13. The structure of claim 11, wherein:
the moving rod is configured to be coupled to a protrusion formed at the locking rod and to a protrusion formed at the second limiting rod as tensile force applied to the cable is transferred to the moving rod, and
the moving rod is configured to integrally move the locking rod and the second limiting rod.

14. The structure of claim 1, wherein the fixing unit further comprises:
a first spring configured to apply an elastic force to the first limiting rod so that the first limiting rod is engaged with the locking rod; and
a second spring configured to apply an elastic force to the second limiting rod so that the second limiting rod is engaged with the first limiting rod.

15. The structure of claim 1, further comprising the vehicle.

* * * * *